United States Patent
Stamer

(10) Patent No.: US 10,761,013 B2
(45) Date of Patent: Sep. 1, 2020

(54) METHOD AND DEVICE FOR CLEANING AN OPTICAL ENTRANCE WINDOW OF A FIRE ALARM

(71) Applicant: Minimax GmbH & Co. KG, Bad Oldesloe (DE)

(72) Inventor: Arne Stamer, Siebenbaeumen (DE)

(73) Assignee: Minimax GmbH & Co. KG, Bad Oldesloe (DE)

( * ) Notice: Subject to any disclaimer, the term of this patent is extended or adjusted under 35 U.S.C. 154(b) by 184 days.

(21) Appl. No.: 15/102,561

(22) PCT Filed: Nov. 13, 2014

(86) PCT No.: PCT/EP2014/074529
§ 371 (c)(1),
(2) Date: Jun. 8, 2016

(87) PCT Pub. No.: WO2015/090749
PCT Pub. Date: Jun. 25, 2015

(65) Prior Publication Data
US 2016/0320292 A1 Nov. 3, 2016

(30) Foreign Application Priority Data

Dec. 17, 2013 (EP) ..................................... 13197886

(51) Int. Cl.
*G01N 21/15* (2006.01)
*B08B 5/02* (2006.01)
(Continued)

(52) U.S. Cl.
CPC .............. *G01N 21/15* (2013.01); *B08B 5/02* (2013.01); *G02B 27/0006* (2013.01);
(Continued)

(58) Field of Classification Search
CPC .. B08B 5/02; G08B 29/043; G01N 2021/151; G01N 21/15; G02B 27/0006
See application file for complete search history.

(56) References Cited

U.S. PATENT DOCUMENTS 4,040,473 A * 8/1977 Wheeler ................. F28D 17/00
165/11.1
4,383,572 A * 5/1983 Bellows ................ F28F 27/006
165/11.1
(Continued)

FOREIGN PATENT DOCUMENTS

DE 19652107 A1 6/1998
DE 4240395 C2 6/2003
(Continued)

OTHER PUBLICATIONS

Minimax GmbH & Co. KG, Product Information Air Shield MX5000, Doc. No. 100026782, Rev. 1, Version 1, 2012, 1 page.

*Primary Examiner* — Mikhail Kornakov
*Assistant Examiner* — Natasha N Campbell
(74) *Attorney, Agent, or Firm* — Perkins Coie LLP

(57) ABSTRACT

A method is provided for cleaning an optical entry window (1) of a fire detector (2), wherein an intermittent gas stream is discharged from at least one gas exit opening (7) onto the surface of the optical entry window (1) of the fire detector (2), wherein the intermittent gas stream having a number of pressure pulses (14) is discharged onto the optical entry window (1), and to an apparatus for cleaning an optical entry window. The method has the advantage that the optical entry window of a fire detector can be cleaned from contamination intermittently and corresponding to the intensity of contamination with a matched and low consumption of gas.

16 Claims, 2 Drawing Sheets

Figure 1:
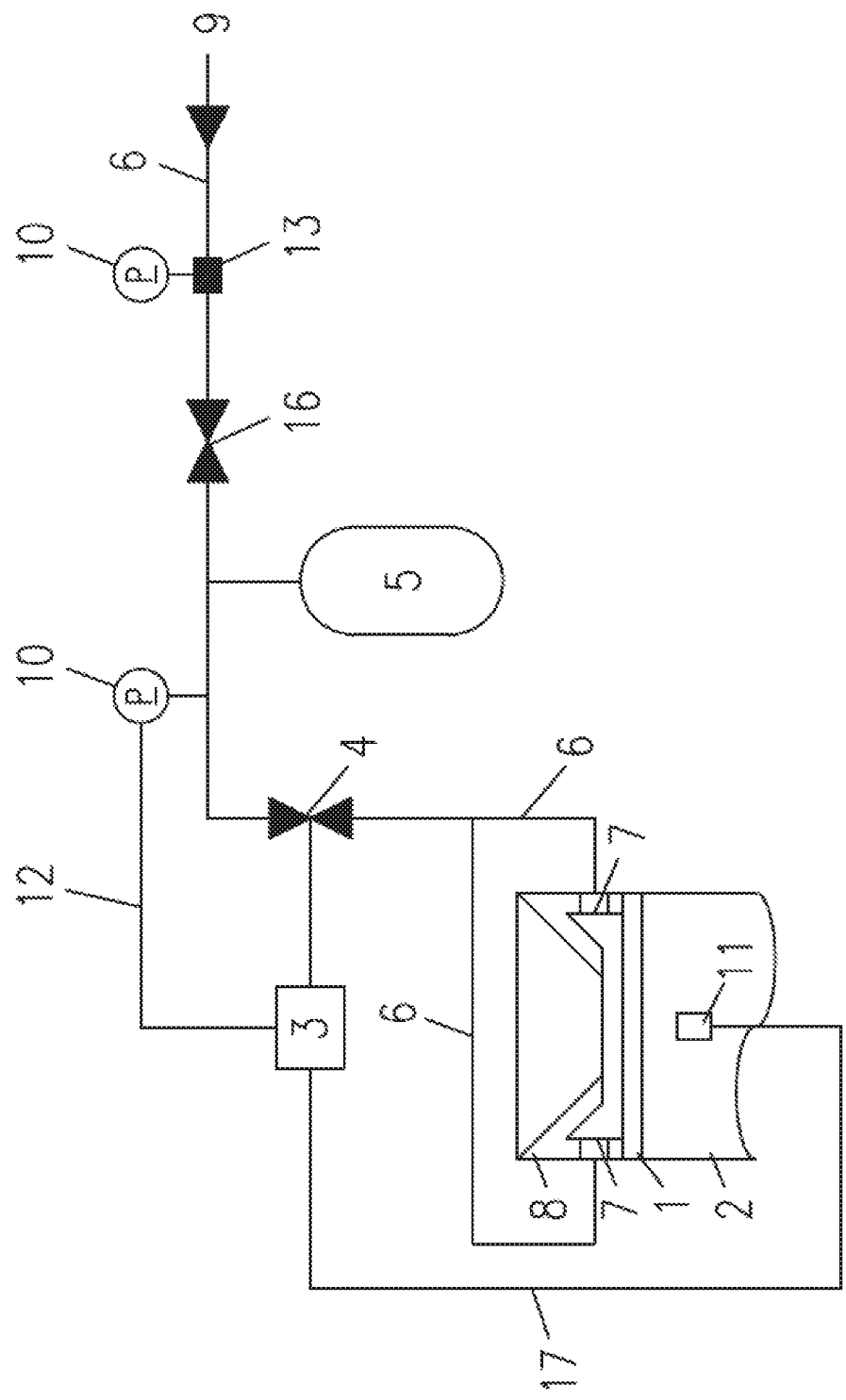

(51) Int. Cl.
  *G08B 17/00* (2006.01)
  *G02B 27/00* (2006.01)
  *G08B 29/04* (2006.01)
  *G08B 29/18* (2006.01)

(52) U.S. Cl.
  CPC ....... *G08B 17/00* (2013.01); *G01N 2021/151* (2013.01); *G08B 29/043* (2013.01); *G08B 29/18* (2013.01)

(56) References Cited

U.S. PATENT DOCUMENTS

| | | | |
|---|---|---|---|
| 4,728,794 | A | 3/1988 | Allen |
| 5,914,489 | A | 6/1999 | Baliga et al. |
| 6,494,021 | B1 * | 12/2002 | Schlagel ............ B29D 11/0024 294/1.2 |
| 2003/0210906 | A1 | 11/2003 | Peterson et al. |
| 2012/0030901 | A1 | 2/2012 | Manninen et al. |
| 2013/0031957 | A1 * | 2/2013 | Shaw .................... G08B 17/00 73/28.01 |

FOREIGN PATENT DOCUMENTS

| | | |
|---|---|---|
| EP | 2381430 B1 | 11/2012 |
| GB | 2337325 A | 11/1999 |
| GB | 2477763 A | 8/2011 |
| KR | 20100013083 A | 2/2010 |
| WO | 2006-033828 A1 | 3/2006 |

* cited by examiner

METHOD AND DEVICE FOR CLEANING AN OPTICAL ENTRANCE WINDOW OF A FIRE ALARM

CROSS-REFERENCE TO RELATED APPLICATIONS

This application is a National Stage of International Application No. PCT/EP2014/074529, filed Nov. 13, 2014 (now WO 2015/090749A1), which is based on EP 13197886.8, filed Dec. 17, 2013 (now EP2887330A1). The entire disclosures of each of the above applications are incorporated herein by reference.

FIELD

The disclosure relates to a method for cleaning an optical entry window of a fire detector and an apparatus for cleaning an optical entry window.

BACKGROUND AND SUMMARY

The disclosure can be used in all places where optical entry windows of fire detectors must remain transmissive for the fire characteristics or the pane has to be cleaned in pre-specified intervals.

The term optical entry window is understood to mean an entry window made from a material that transmits, to a sufficient extent, the fire characteristic, i.e. in the form of electromagnetic radiation, for detecting fire characteristics into the interior of the fire detector to sensor elements. The optical entry window can here be transmissive for infrared radiation, visible light, and/or UV-radiation, depending on the sensor means used in the interior of the fire detector.

The optical entry window is occasionally therefore also called an inspection glass even though it does not need to be designed to be transparent in all cases.

Optical entry windows of fire detectors ensure a faultless function only if, through these, signals can reach sensor elements. In an environment in which dust particles or powder are present as suspended matter in the surrounding air, it often happens that the optical entry window of the fire detector is contaminated by dirt or powder depositions so that fire signals reach the sensor of the fire detector only insufficiently or erroneously. It is therefore requisite always to keep the entry window free from deposits or contamination.

To monitor the degree of contamination of optical entry windows, the person skilled in the art knows different possibilities. As a rule, radiation is emitted to the optical entry window and the reflected radiation and the radiation passing through the optical entry window are measured in a sensory manner and compared.

In DE 42 40 395 C2, U.S. Pat. No. 5,914,489 A or U.S. Pat. No. 4,728,794, these methods and the corresponding apparatus are described.

To ensure that the optical entry windows are kept free from a deposit or contamination, fire detectors having air-flushing devices were developed that on the one hand constantly establish an air cushion in front of the window in order to prevent deposits of process materials. On the other hand, pressure-flushing devices are known so as to clean the inspection glass at regular intervals. Over and above this, cleaning can also take place mechanically.

All these known possibilities for cleaning the optical entry window of a fire detector cannot prevent powders or dusts having specific attributes from depositing in the environment of the fire detector and on the optical entry window. These dusts and particles cannot be removed using conventional pressure-flushing devices or an air cushion. In the case of optical entry windows provided with a protective grid, mechanical cleaning is also not possible without any problems unless the protective grid is removed manually and the optical entry window is cleaned mechanically.

All the apparatus and methods mentioned describe possibilities for cleaning the optical entry windows of a fire detector using a continuous air stream or gas stream.

Because of the continuous consumption of air, relatively low pressures are used. The consumption of such installations still adds up to considerable values in particular in the case of installations having several fire detectors with air flushing. Pressurized air is regarded as one of the most expensive energy sources that often entail high costs for the operator. The cleaning action of the instruments known according to the prior art is still often insufficient.

EP 2 381 430 B1 describes a method and an apparatus for cleaning an optical entry window of a fire detector, a pulsating gas stream being guided across the surface of the optical entry window, where a rhythmically leaking or pulsating gas stream being produced in that a pressure is built up between an elastic lip and the optical entry window and the pulsating gas stream escapes in that the elastic lip impacts the optical entry window.

This method, too, consumes a lot of pressurized air since pressurized air escapes in regular intervals that cannot be controlled. Furthermore, pressurized air always crosses the optical window only horizontally. As a result of the fact that the elasticity of the lip changes over a long period of time, leaks can develop so that the cleaning action degrades or totally fails in the case of a defect.

The intermittent application of a gas or pressurized-air stream onto the optical entry window of the fire detector using a selectable pressure-pulse duration and pressure-pulse sequence and also different and very high intensity is not possible using this apparatus.

Starting from this prior art, the object of the disclosure is therefore to develop a method and an apparatus using which the optical entry window of a fire detector can be kept free from dust particles with little effort and at the same time reliably intermittently.

The inventive method comprises the following steps: discharging an intermittent gas stream from at least one gas exit opening onto the surface of the optical entry window of the fire detector, wherein the intermittent gas stream is discharged using a plurality of pressure pulses onto the optical entry window.

Stated differently, the intermittent gas stream is guided from the gas exit opening across the surface of the optical entry window of the fire detector. As a result, an intensive intermittent gas stream is discharged onto the optical entry window preferably using a multiplicity of pressure pulses with in each case a short duration $t_1$, wherein a plurality of pressure pulses form a pressure-pulse series having a time $t_2$ between two pressure pulses and a pause time $t_3$, exists between the pressure-pulse series.

The inventive method for cleaning an optical entry window of a fire detector provides an intermittent gas stream that acts at predetermined time intervals with high intensity and short exposure time on the surface of the optical entry window. The intermittent gas stream is realized by pressure pulses. The pressure pulses are preferably generated by switching a valve that is arranged in a pressure line that connects a gas supply system, preferably a pressurized-air system, to the at least one gas exit opening and opens or closes this connection by switching the valve.

The time intervals and the exposure time of the pressure pulses are preferably specified in advance by a control unit such as for example a fire detection panel and/or extinguishing control panel and its software or by another control center. These specifications can be made as a function of the contamination.

The control unit preferably transmits control signals to the valve in order to switch an opening and closing of the valve. These are for example voltage or current signals, depending on the type of valve that is selected in each case.

For supplying the intermittent gas stream, gas from a gas supply system is used that conveys the gas at a desired pressure via corresponding pressure lines from the gas supply system to the at least one gas exit opening. In an advantageous design, the gas supply system represents a pressurized-air system and the gas is then preferably pressurized air.

The disclosure is preferably developed further in that a plurality of pressure pulses form a pressure-pulse series with a time between two pressure pulses and a pause time exits between the pressure-pulse series and wherein for discharging the gas stream from the gas exit opening a valve is provided, the method further comprising the steps: switching the valve into an open position for the duration of a pressure pulse, switching the valve into a closed position for the time between two pressure pulses and for the pause time between two pressure-pulse series, wherein these switching steps are carried out by a control unit by means of transmitting corresponding control signals from the control unit to the valve.

The term "corresponding control signals" means a relevant control signal for switching the valve into an open position or into a closed position of the valve. In the open position of the valve, the gas stream that is pressurized is released in the direction of the gas exit opening, interrupted in the closed position.

The intermittent gas stream is preferably emitted or applied onto the optical entry window in a plurality of short pressure pulses at a high pressure and high speed via one or more gas exit openings. A "high" pressure is here meant to be a pressure of up to 30 bar. Between two subsequent pressure pulses within a pressure-pulse series there is preferably a time without pressure pulse. This time is called time $t_2$ between two pressure pulses. The duration $t_1$, in which the pressure pulse acts, and the time $t_2$ between two pressure pulses are predetermined in accordance with a specific application and can for example be approximately equal.

Between two pressure-high pulse series there is a pause time $t_3$. This pause time contributes very substantially to lowering the energy consumption or the gas consumption.

The duration $t_1$ of a pressure pulse, the time $t_2$ between two pressure pulses, and the pause time $t_3$ between two pressure-pulse series are preferably realized by transmitting control signals of a control unit to a valve. Preferably a solenoid valve or a pneumatic valve or some other valve is use.

In a further preferred embodiment, the duration $t_1$ of a pressure pulse, the time $t_2$ between two pressure pulses, and the pause time $t_3$ between two pressure-pulse series are realized by means of a pneumatic control.

It is advantageous if the duration $t_1$ of the pressure pulse amounts to 10 milliseconds up to 5 seconds. A time of 0.5 seconds is particularly preferable.

It is further preferable if the time $t_2$ between two pressure pulses amounts to 10 milliseconds up to 5 seconds. A time of 0.5 seconds is particularly preferable.

It is preferable if the number of subsequent pressure pulses of a pressure-pulse series amounts to 1 to 200 pressure pulses. Particularly preferably are four subsequent pressure pulses. In an alternative design of the method, 1 to 100 pressure pulses are preferable.

The pause time $t_3$ between two pressure-pulse series preferably amounts to 2 seconds up to 60 minutes. Particularly preferably, the pause time $t_3$ amounts to one minute.

In a particularly preferred design of the inventive method, the method further comprises the steps: monitoring a degree of contamination of the optical entry window by means of a monitoring means, transmitting a representative signal to the control unit as soon as a predetermined limit value of the degree of contamination is exceeded, and switching the valve for discharging the intermittent gas stream, preferably via a pressure line and the gas exit opening onto the optical entry window until the degree of contamination no longer exceeds the predetermined limit.

Stated differently, driving the valve for releasing the gas stream, for generating the pressure pulses, the pressure-pulse series and the number of pressure pulses in the pressure-pulse series takes place by the control unit as a function of the degree of contamination of the optical entry window.

The degree of contamination is preferably determined using a monitoring means. When a pre-specified limit value of the degree of contamination is exceeded, the monitoring means delivers a representative signal to the control unit. This signal is preferably sent by the monitoring means or by the fire detector itself to the control unit. In an advantageous design, the control unit also detects the presence of a state in which the degree of contamination does not exceed (no longer exceeds) a pre-specified limit value. In this case, flushing the optical entry window using the intermittent gas stream is reduced or interrupted.

The method is preferably further developed to the extent that after detecting by the monitoring means that the contamination no longer exceeds the predetermined limit value or falls below it again, the steps are carried out: continuously feeding the intermittent gas stream for a predetermined post-flushing duration, preferably in a range of 1 second up to 10 minutes, and switching the valve into the closed position after the end of the post-flushing duration.

By means of the control signals of the control unit that are sent to the valve, the pressure pulses and the pressure-pulse sequence described above are realized using the times $t_1$, $t_2$ and $t_3$.

Instead of a solenoid valve also another valve, for example a valve to be activated pneumatically, is conceivable.

The gas supply system is designed such that the necessary pressure of the pressure pulses is available. In an advantageous design variant the pressure of the pressure pulses is in a range between 1 to 30 bar, in a further preferred design it is in a range between 2 and 10 bar. In a particularly preferable design variant, a pressure of 5 bar is used.

As mentioned initially, in a further aspect the apparatus also relates to an apparatus for cleaning the optical entry window of a fire detector.

The disclosure solves the object, on which it is based, in the case of such an apparatus in that it comprises at least one gas exit opening for discharging a gas stream onto the surface of the optical entry window of the fire detector, a control unit, and a valve, wherein the control unit is connected in a signal-conducting manner to the valve and is designed to switch the valve selectively into an open or closed position, wherein the valve is connected in a fluid-conducting manner, preferably by means of a pressure line, to the at least one gas exit opening, wherein the control unit is designed to drive the valve such that an intermittent gas stream having a number of pressure pulses is discharged from the at least one gas exit opening onto the optical entry window of the fire detector.

The gas exit opening is preferably connected in a fluid-conducting manner by means of a pressure line with a gas supply system from which pressurized air is guided to the gas exit opening at times ($t_1$, $t_2$, $t_3$) pre-specified by the control unit.

The control unit is preferably designed to switch the valve according to the method described above.

The gas stream can contain one or a plurality of gases. Preferably pressurized air is used that represents a gas mixture. The gas supply system generates the required pressure of the gas stream. By opening and closing the valve by means of driving from the control unit, the flow of the gas stream from the gas supply system to the at least gas exit opening is released or blocked and pressure pulses of the gas stream and pressure-pulse series having a pre-defined number of pressure pulses are generated.

The at least one gas exit opening is arranged on a gas discharge means.

The gas discharge means exhibits the at least one gas exit opening for discharging a gas stream onto the surface of the optical entry window of the fire detector. Furthermore at least one port of the pressure line is arranged on the gas discharge means and is connected in a fluid-conducting manner to the at least one gas entry duct that opens into the at least one gas exit opening. In a preferred design, the gas output means is a nozzle of a diffuser.

In advantageous design variants where 2, 3 or 4 gas exit openings are arranged, a corresponding number of nozzles or diffusers is arranged and the gas stream is guided directly onto the optical entry window.

The gas discharge means is designed to discharge an intermittent gas stream having a number of pressure pulses from the at least one gas exit opening onto the surface of the optical entry window of the fire detector.

In the preferred design of the apparatus, the gas output means exhibits three gas entry ducts that open into three gas exit openings. In this case, also three ports for the pressure line are arranged on the gas discharge means, that are connected in a fluid-conducting manner to the gas entry ducts.

In an advantageous design of the apparatus the gas discharge means is exchangeable arranged on the housing of the fire detector by means of connection means. In another design variant, the gas discharge means is integrated into the housing of the fire detector.

In a further advantageous design, the gas stream or the pressurized air exits from an opening that runs around the optical entry window. The opening is adapted to the geometric shape of the entry window. It is for example advantageous to use an annularly designed exit gap as gas exit opening for a circular entry window.

In an advantageous design, the gas discharge means for distributing the gas stream onto the optical entry window is fastened on the housing of the fire detector and termed an add-on part. This gas discharge means exhibits at least one port for the connection to the pressure line that guides the gas stream, preferably the pressurized air from the gas supply system, preferably to a pressurized-air system. Particularly preferable are 3 ports so that a uniform distribution of the gas stream or of the pressurized air that is guided from the gas exit openings onto the optical entry window is achieved.

Particularly preferable is the circular arrangement of the 3 gas exit openings at a distance of 120°.

In a further advantageous design there is arranged between the direct path of the gas stream from the port of the add-on part and the optical entry window a gas-stream distributing means that is designed to uniformly distribute the gas stream, since a maximum of the pressure value of the gas stream is present in the area of the gas exit opening.

In a further advantageous design, the fire detector is connected to the add-on part by means of connection elements such that, by means of quick assembly, the fire detector can be connected to the add-on part or removed again with a simple rotary movement.

The annular-gap opening exhibits, in a further advantageous design, constrictions at certain points of the circumference of the optical entry window so that a pressure increase is generated in these areas in a targeted manner.

There is further arranged the control unit that is connected to a valve such as a solenoid valve or an electrically triggerable valve or the pneumatic valve. For the signal-conducting connection between the control unit and the valve, preferable corresponding lines, such as electrical lines, are provided. As an alternative or in addition the control unit is designed to switch the valve by means of excitation from pneumatic control lines of by means of cable-free data transmission, for example by radio, depending on the selected valve type.

The valve is preferably arranged in the pressure line that can be connected to a gas supply system or is part of it. The gas supply system is preferably a pressurized-air system. In a preferred embodiment, a pressurized-gas reservoir is arranged upstream from the valve and connected to the valve in a fluid-conducting manner. Stated differently, the pressurized-gas reservoir is arranged between the gas supply system and the valve.

Preferably a further valve, a stop valve, is arranged between the pressurized-gas reservoir and the gas supply system. This valve serves as a stop possibility when working on the system, in addition it can be used to reduce the supply of air in the pause time $t_3$ between two pressure-pulse series so that the gas supply system is not loaded with pressure pulses.

In a particular design, the stop valve is designed as a solenoid valve and connected to the electronic control unit.

The pressurized-gas reservoir can be designed as one or more pressurized-gas cylinders. From this pressurized-gas cylinder, the pressurized gas can be guided to the gas exit opening and exit therefrom at the times or time intervals pre-specified by the control unit.

Using the gas supply system, the pressurized-gas reservoir can be charged again and again. This can take place in an advantageous manner during the time between the pressure-pulse series. If this charging takes place with a reduced flow rate, the pressurized-gas reservoir has the advantage that the gas supply system is not loaded with the pressure pulses.

In a particularly preferred design of the inventive apparatus, driving the valve for releasing the gas stream takes place via at least one gas exit opening via the optical entry window by the control unit as a function of the degree of contamination of the optical entry window. In this embodiment, the control unit is designed to switch the valve as a function of the degree of contamination of the optical entry window.

For this purpose, the apparatus for cleaning the optical entry window preferably exhibits a monitoring means for monitoring the degree of contamination of the optical entry window, that is connected to the control unit in a signal-conducting manner and is designed to transmit a representative signal to the control unit when a pre-specified limit value of the degree of contamination is exceeded, wherein the control unit is designed to switch the valve to output the intermittent gas stream when receiving the representative signal.

In a further advantageous design of the apparatus, it exhibits a monitoring means for monitoring the degree of contamination of the optical entry window, that is connected to the control unit in a signal-conducting manner and is designed to transmit a representative signal to the control unit when a pre-specified limit value of the degree of contamination is exceeded. Here the control unit is designed, when receiving the representative signal, to switch the valve to output the intermittent gas stream until the degree of contamination no longer exceeds the pre-specified limit value or is in a pre-defined admissible range.

The monitoring means that can be designed as a sensor-monitoring system or can be part of such a system is preferably designed to measure the degree of contamination of the optical entry window. A preferred monitoring means exhibits means for irradiating the optical entry window using electromagnetic radiation at a predetermined wavelength, preferably radiation sources in the ultraviolet (UV) and/or in the infrared (IR) range, and also means for quantitatively detecting that part of the radiation that is reflected by the optical entry window and/or means for quantitatively detecting that part of the radiation that passes through the optical entry window, and/or means for quantitatively detecting that part of the radiation that is absorbed when impinging on the optical entry window.

The means for quantitatively detecting the part of the reflected, transmitted or the absorbed radiation are preferably radiation sensors for detecting electromagnetic radiation in the ultraviolet (UV) and/or in the infrared (IR) range. These means further comprise a signal-processing unit. It comprises a microcontroller or a microprocessor, A/D and D/A converters and storage elements and means for signal transmission to the control unit via a signal-conducting connection between the monitoring means and the control unit. In the storage elements, the pre-defined limit value of the degree of contamination of the optical entry window and/or a pre-defined admissible range are stored.

In a preferred design, these radiation sensors represent the radiation sensors of the fire detector for detecting the fire characteristic. In this case, the monitoring means is at the same time a sensor-monitoring means. In a further preferred design, the signal-processing unit of the monitoring means is the signal-processing unit of the fire detector. In this case, the signal-conducting connection between the monitoring means and the control unit represents the signal-conducting connection between the fire detector and the control unit.

The monitoring means is designed to determine, from this quantitative detection, a representative numerical value on how much radiation, in comparison to a predetermined uncontaminated state, is reflected or transmitted or absorbed and to compare it with the predetermined limit value. When this limit value is reached or exceeded, the monitoring means then transmits the representative signal to the control unit.

In a further advantageous embodiment of the inventive apparatus, which is advantageously employed in particular if the fire detector does not exhibit any suitable sensor-monitoring system for monitoring the degree of contamination of the optical entry window of the fire detector, the control unit is designed to switch the valve for outputting the intermittent gas stream, in particular for generating the pressure pulses of the gas stream, at pre-defined times. These switching times can be periodic, or aperiodic as a function of the environmental conditions. The control unit is preferably preprogrammed with these times or can be programmed with these times via an input apparatus.

It is furthermore advantageous if a pressure-measuring instrument and a valve are arranged before and after (upstream and downstream from) the pressurized-gas reservoir. As a pressure-measuring instrument, a manometer is suitable.

There is preferably further arranged upstream from the valve, particularly preferably between the pressurized-gas reservoir and the gas supply system, a pressure-reducing valve that can be used to set the operating pressure for the pressurized-gas reservoir.

In a preferred embodiment, the gas supply system exhibits a compressor, for example an electric compressor, that is designed to fill the pressurized-gas reservoir with gas.

The inventive method and the apparatus exhibit the advantage that the optical entry window of a fire detector can be freed from contamination intermittently and corresponding to the intensity of contamination with a matched and low consumption of gas.

A gas jet that impinges on the optical entry window of the fire detector at high speed generates vortices so that contamination on the entire surface is caught and flushed away with high intensity.

DRAWINGS

Figure 2:
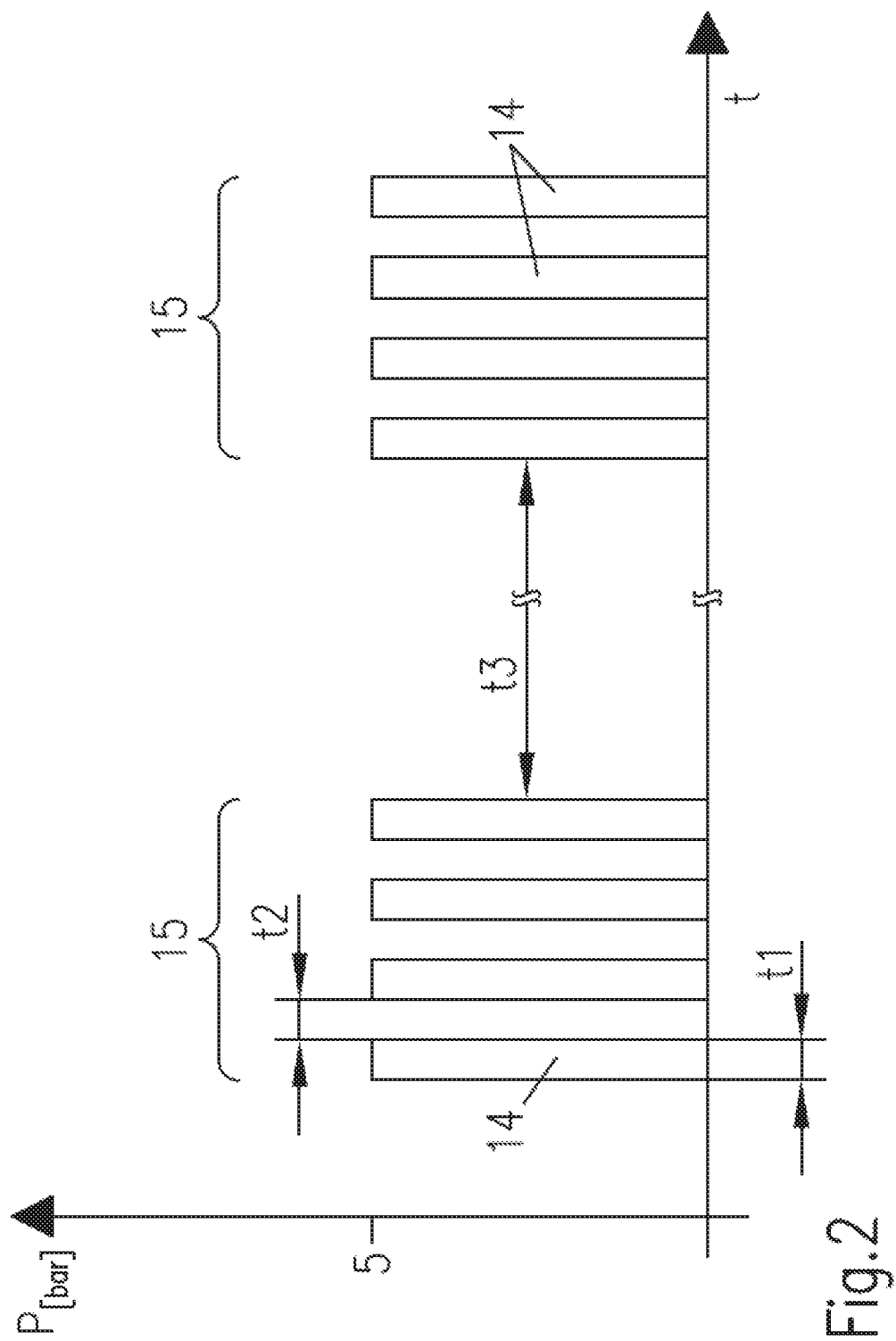

The disclosure is explained below in more detail using a preferred exemplary embodiment with reference to the attached figures. The figures show:

FIG. 1 is an apparatus for cleaning an optical entry window in a schematic illustration, and FIG. 2 is a schematic representation of pressure impulses over time.

DETAILED DESCRIPTION

FIG. 1 shows schematically an inventive apparatus for cleaning an optical entry window 1 of a fire detector 2 by means of a gas exit opening 7 in a gas discharge means 8. The gas discharge means 8 is fitted above the optical entry window 1 in such a manner that its circular recess encompasses the optical entry window. The circular recess is dimensioned such that the viewing angle of the sensors (not shown) of the fire detector 2 for detecting the fire characteristic electromagnetic radiation is not reduced. This viewing angle is essentially pre-specified by the diameter of the effectively acting optical entry window, the sensitive face of the sensors, and the distance of the sensors from the optical entry window.

The gas discharge means 8 exhibits two gas exit openings 7 for discharging a gas stream onto the surface of the optical entry window 1 of the fire detector 2. Not illustrated are the two ports of the pressure line 6 on the gas discharge means that are connected in a fluid-conducting manner to the respective gas entry duct and open into the gas exit openings 7.

The gas discharge means 8 is designed to output an intermittent gas stream having a number of pressure pulses 14 from the gas exit openings 7 onto the surface of the optical entry window 1 of the fire detector 2.

It is however also possible to provide a plurality of gas exit openings 7 in the gas discharge means 8, for example 2, 3, 4 or more.

The gas exit openings 7 in the gas discharge means 8 are connected in a fluid-conducting manner via a fluid-conducting gas entry duct to a port (not shown) for the pressure line 6 on the gas discharge means 8, thus also in the fluid-conducting manner to this pressure line 6. In the illustrated design the pressure line 6 is designed as a pressurized-air line.

The pressurized air is supplied by a gas supply system 9 to which the gas exit openings 7 are connected in a fluid-connecting manner via the pressure line 6 and a valve 4. Thus the valve 4 is connected in a fluid-conducting manner, preferably by means of the pressure line 6, to the gas exit openings 7. In the switching position "open" of the valve 4 the pressurized-air stream is released to the gas exit openings 7 for discharging a gas stream from this gas exit opening onto the surface of the optical entry window 1.

The inventive apparatus illustrated in FIG. 1 further comprises a control unit 3 and the valve 4, wherein the control unit 3 is connected in a signal-conducting manner to the valve 4 and is designed to selectively switch the valve 4 into an open or closed position. Here the control unit 3 is designed to drive the valve 4 such that an intermittent gas stream having a number of pressure pulses 14 (FIG. 2) is discharged from the gas exit opening 7 onto the surface of the optical entry window 1 of the fire detector 2.

In the illustrated design variant, the valve 4 is designed as a solenoid valve that is controlled by the control unit 3, in this case formed as a fire detection panel and/or extinguishing control panel, via the signal-conducting connection. This fire detection panel and/or extinguishing control panel realizes the switching of the valve into an open switching position for the duration $t_1$ of the pressure pulse 14, into a closed switching position for a time $t_2$ between the pressure pulses 14 and for the pause time $t_3$ between the pressure-pulse series 15 and also the frequency of driving for generating the number of pressure pulses 14 within a pressure-pulse series 15 by means of its software and/or hardware.

The pressurized-gas reservoir 5 is connected via the pressure line 6 to a gas supply system 9, formed as a pressurized-air system, from which pressurized air can fill up the pressurized-gas reservoir 5 during the pause time $t_3$ between two pressure-pulse series 15. Upstream and downstream from the pressurized-gas reservoir 5 the valve 4 and the stop valve 16 and the manometer 10 are arranged that can be connected to the control unit 3 by means of electric lines 12. As a result it is possible to control the valve 4 and the stop valve 16 as a function of the measured pressure. In the illustrated example, the stop valve is a manually actuated valve and not connected to the control unit 3 by means of a line.

Between the gas supply system 9 and the valve 4, a pressure-reducing valve 13 is arranged using which the operating pressure for the pressurized-gas reservoir 5 can be set.

The fire detector 2 exhibits a monitoring means 11 that is connected to the control unit 3 by means of a signal-conducting connection 17. The signal-conducting connection 17 can be realized by means of electric lines or without cables, for example by radio.

Not illustrated is a further preferred design of the apparatus in which the signal processing of the sensor-monitoring system or monitoring means is carried out by the electronic circuit of the fire detector 2. In this case, the signal-technical connection 17 represents the signal-technical connection of the fire detector to the control unit.

Via the signal-technical connection 17, the monitoring means 11 sends to the control unit 3 a representative signal that is a measure for the contamination of the optical entry window 1. This measure can be pre-specified as a limit value or represent a quantitative or a relative instantaneous value. In the case of contamination of the optical entry window 1 beyond a specific measure, for example when a pre-specified limit value is exceeded, the control unit 3 triggers by means of its implemented software, by sending control signals to the valve 4, in a targeted manner an intermittent gas stream with pressure pulses 14, preferably in a plurality of pressure-pulse series 15, at the times $t_1$, $t_2$ and $t_3$ (FIG. 2). In the illustrated design, this takes place until the sensor-monitoring system 11 no longer detects any inadmissible contamination, i.e. the degree of contamination is in a pre-defined admissible range.

As an alternative or in addition, the control unit 3, on the basis of a predetermined time schedule stored preferably in terms of program-technology in the control unit 3, the pressure pulses 14 and the pressure-pulse series 15 for a pre-specified duration. This also enables cleaning without detecting a specific degree of contamination by means of the monitoring means 11 and ensures the cleaning function even in cases where the monitoring means 11 does not function or no monitoring means is present.

FIG. 2 shows in a schematic illustration an excerpt from a plurality of pressure-pulse series 15 by the example of 2 pressure-pulse series 15 that in each case contain 4 pressure pulses. What is shown is the duration $t_1$ of the pressure pulses 14 on a time axis. The pressure pulses 14 represent the pressure at which the pressurized air acts on the optical entry window 1 via the gas exit openings 7 in a time pre-specified by the control unit 3.

A plurality of pressure pulses 14 form a pressure-pulse series 15. FIG. 2 illustrates as an example two pressure-pulse series 15. Each pressure pulse 14 lasts for a pre-specified time $t_1$, that is, during the first pressure pulse 14 the pressurized air acts for approximately 0.5 seconds on the entry window 1. This is followed by a time $t_2$ between the pressure-air pulses 14, during which no pressurized air acts on the entry window 1. In the illustrated case $t_2 = t_1 = 0.5$ s. FIG. 1 illustrates four pressure pulses 14 and their duration $t_1$ and three times $t_2$ between the pressure pulses 14. These pressure pulses 14 form a pressure-pulse series 15.

The pressure-pulse series 15 that lasts 3.5 seconds is followed the pause time $t_3$ between the pressure-pulse series 15. In the illustration it amounts to 10 minutes. Then follows a further pressure-pulse series 15.

It should be understood that the disclosure can also be used for fire detectors 2 that do not exhibit any monitoring means 11 for detecting the degree of contamination of the entry window 1. In this case, driving the valve 4 by the control unit 3 takes place at predefined times and with a pre-specified frequency and duration that are matched to the environmental conditions of the cause of the contamination.

If the contamination intensity changes in principle as a result of environmental influences or similar, the parameters of the time $t_1$, $t_2$ and $t_3$ and/or the frequency of the pressure pulses can be matched by programming the control unit 3.

LIST OF REFERENCE SYMBOLS USED 1 optical entry window
2 fire detector 3 control unit
4 valve
5 pressure-gas reservoir
6 pressure line
7 gas exit opening
8 gas discharge means
9 gas supply system
10 manometer
11 monitoring means
12 electric line
13 pressure-reducing valve
14 pressure pulse
15 pressure-pulse series
16 stop valve
17 signal-conducting connection
$t_1$ duration of a pressure pulse 14
$t_2$ duration between two pressure pulses 14
$t_3$ pause time between two pressure-pulse series 15

The invention claimed is:

1. A method for cleaning an optical entry window of a fire detector, comprising the steps:
    forming at least one gas exit opening proximate the optical entry window with a gas discharge means that encompasses the optical entry window, and
    discharging an intermittent gas stream from the at least one gas exit opening uniformly onto a surface of the optical entry window of the fire detector, wherein the intermittent gas stream having a number of pressure pulses is discharged onto the optical entry window;
    wherein a duration ($t_1$) of the pressure pulse amounts to 10 milliseconds up to 5 seconds; and
    wherein a time ($t_2$) between two pressure pulses amounts to 10 milliseconds up to 5 seconds.

2. The method according to claim 1,
    wherein a plurality of pressure pulses form a pressure-pulse series with the time ($t_2$) between two pressure pulses, and wherein for discharging the gas stream from the at least one gas exit opening a valve is provided, wherein the method further comprises the steps:
    switching the valve into an open position for the duration ($t_1$) of a pressure pulse, and
    switching the valve into a closed position for the time ($t_2$) between two pressure pulses, wherein these switching steps are carried out by a control unit by means of transmitting corresponding control signals from the control unit to the valve.

3. The method according to claim 2, comprising the steps:
    monitoring a degree of contamination of the optical entry window by a monitoring means,
        transmitting a representative signal to the control unit as soon as a predetermined limit value of the degree of contamination is exceeded, and
        switching the valve for discharging the intermittent gas stream via a pressure line and the gas exit opening onto the optical entry window until the degree of contamination no longer exceeds the predetermined limit.

4. The method according to claim 2, wherein a pause time ($t_3$) exists between the pressure pulse series, wherein the method further comprises the step:
    switching the valve into a closed position for the pause time ($t_3$) between two pressure pulse series, wherein the switching step is carried out by a control unit by transmitting corresponding control signals from the control unit to the valve.

5. The method according to claim 1, wherein a number of subsequent pressure pulses of a pressure-pulse series amounts to one to ten pressure pulses.

6. The method according to claim 1, wherein a plurality of pressure pulses form a pressure-pulse series with the time ($t_2$) between two pressure pulses and wherein a pause time ($t_3$) between two pressure-pulse series amounts to 2 seconds up to 60 minutes, and the pressure of the pressure pulse amounts to 2 to 10 bar.

7. The method of claim 1, wherein the at least one gas exit opening is arranged on the gas discharge means and the intermittent gas stream exits from an opening that runs around the optical entry window.

8. The method of claim 7, wherein the opening is adapted to the geometric shape of the optical entry window.

9. The method of claim 8, wherein the intermittent gas stream exits from an annular exit gap.

10. A method for cleaning an optical entry window of a fire detector, comprising:
    discharging an intermittent gas stream from a gas exit opening onto a surface of the optical entry window of the fire detector, and uniformly distributing the intermittent gas stream onto the optical entry window, wherein the gas exit opening comprises an annular gap opening, wherein the intermittent gas stream is uniformly distributed through the annular gap opening, and wherein a duration ($t_1$) of a pressure pulse of the intermittent gas stream amounts to 10 milliseconds up to 5 seconds; and
    wherein a time ($t_2$) between two pressure pulses of the intermittent gas stream amounts to 10 milliseconds up to 5 seconds.

11. The method of claim 10, further comprising arranging the gas exit opening on a gas discharge means and exiting the intermittent gas stream from the annular gap opening.

12. A method for cleaning an optical entry window of a fire detector, comprising the steps:
    forming at least one gas exit opening at the circumference of the optical entry window of the fire detector; and
    discharging an intermittent gas stream from the at least one gas exit opening onto a surface of the optical entry window of the fire detector, wherein a duration ($t_1$) of a pressure pulse of the intermittent gas stream amounts to 10 milliseconds up to 5 seconds;
    wherein a time ($t_2$) between two pressure pulses of the intermittent gas stream amounts to 10 milliseconds up to 5 seconds and;
    wherein the forming the at least one gas exit opening at the circumference of the optical entry window comprises locating a gas discharge means above the optical entry window.

13. The method of claim 12, wherein the at least one gas exit opening runs around the optical entry window.

14. The method of claim 12, wherein the at least one gas exit opening comprises a plurality of gas exit openings.

15. The method of claim 12, wherein the discharging an intermittent gas stream from the at least one gas exit opening onto a surface of the optical entry window of the fire detector comprises radially discharging the intermittent gas stream from the at least one gas exit opening onto the optical entry window.

16. The method of claim 12, wherein forming the at least one gas exit opening at the circumference of the optical entry window further comprises encompassing the optical entry window with the gas discharge means.

* * * * *